United States Patent
Arai

(10) Patent No.: US 9,862,274 B2
(45) Date of Patent: Jan. 9, 2018

(54) DISPLAY DEVICE FOR VEHICLE

(71) Applicant: CALSONIC KANSEI CORPORATION, Saitama (JP)

(72) Inventor: Kazuo Arai, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 14/415,959

(22) PCT Filed: Apr. 9, 2013

(86) PCT No.: PCT/JP2013/060686
§ 371 (c)(1),
(2) Date: Jan. 20, 2015

(87) PCT Pub. No.: WO2014/017129
PCT Pub. Date: Jan. 30, 2014

(65) Prior Publication Data
US 2015/0183322 A1    Jul. 2, 2015

(30) Foreign Application Priority Data
Jul. 25, 2012  (JP) .................................. 2012-164354

(51) Int. Cl.
*B60K 37/04* (2006.01)
*G02B 5/02* (2006.01)
(Continued)

(52) U.S. Cl.
CPC .............. *B60K 37/04* (2013.01); *B60K 37/06* (2013.01); *G02B 5/02* (2013.01); *G02B 27/0101* (2013.01);
(Continued)

(58) Field of Classification Search
CPC .......... B60K 37/04; B60K 37/06; G02B 5/02; G02B 27/01; G02B 27/0101;
(Continued)

(56) References Cited

U.S. PATENT DOCUMENTS 3,508,520 A * 4/1970 Fink ........................ H03J 1/045
116/246
3,574,283 A * 4/1971 Albers ....................... G01S 1/02
340/980

(Continued)

FOREIGN PATENT DOCUMENTS

JP    4-131530 U    12/1992
JP    5-26590 U     4/1993
(Continued)

OTHER PUBLICATIONS

International Search Report for PCT/JP2013/060686 dated May 21, 2013.

*Primary Examiner* — William R Alexander
(74) *Attorney, Agent, or Firm* — Kenealy Vaidya LLP

(57) ABSTRACT

A vehicle display device 10 includes a combiner 4, provided between a windshield 1 and a driver's seat, and including a transparent region portion 4a and a display styling portion 40 having a light diffusion function, and an illuminating unit 3, which is capable of selectively illuminating the display styling portion 40 and the transparent region portion 4a at the periphery of the display styling portion 40.

6 Claims, 12 Drawing Sheets

(51) Int. Cl.
    *G02B 27/01* (2006.01)
    *B60K 37/06* (2006.01)
(52) U.S. Cl.
    CPC ............ *B60K 2350/1072* (2013.01); *B60K 2350/2017* (2013.01); *B60K 2350/2052* (2013.01); *B60K 2350/405* (2013.01); *G02B 2027/0112* (2013.01); *G02B 2027/0118* (2013.01)
(58) Field of Classification Search
    CPC .... G02B 2027/0112; G02B 2027/0118; G02B 2027/0141
    USPC .............................. 359/629, 630, 639; 345/7
    See application file for complete search history.

(56) References Cited

U.S. PATENT DOCUMENTS

| | | | | |
|---|---|---|---|---|
| 4,194,199 | A * | 3/1980 | Shepherd | G01D 7/04 340/462 |
| 5,289,315 | A | 2/1994 | Makita et al. | |
| 5,313,292 | A * | 5/1994 | Wood | B32B 17/10036 359/13 |
| 5,406,303 | A * | 4/1995 | Salmon | B60K 35/00 116/DIG. 36 |
| 5,892,598 | A * | 4/1999 | Asakawa | G02B 27/01 345/7 |
| 5,963,280 | A * | 10/1999 | Okuda | G01C 21/365 349/64 |
| 6,404,333 | B1 | 6/2002 | Ayres et al. | |
| 6,535,333 | B1 * | 3/2003 | Piepel | G03B 21/56 349/9 |
| 7,126,583 | B1 * | 10/2006 | Breed | B60K 35/00 345/158 |
| 7,413,233 | B1 * | 8/2008 | Jung | B60R 11/0235 296/97.7 |
| 7,874,689 | B2 * | 1/2011 | Tane | B60K 35/00 362/23.01 |
| 8,160,298 | B2 * | 4/2012 | Okumura | B60K 35/00 382/103 |
| 2002/0154349 | A1 * | 10/2002 | Halldorsson | B60K 35/00 359/15 |
| 2006/0103590 | A1 * | 5/2006 | Divon | G02B 27/01 345/7 |
| 2006/0158320 | A1 * | 7/2006 | Shibata | B60K 37/02 340/425.5 |
| 2006/0215244 | A1 * | 9/2006 | Yosha | G02B 27/0101 359/15 |
| 2007/0009714 | A1 * | 1/2007 | Lee | B32B 17/10568 428/172 |
| 2007/0188022 | A1 * | 8/2007 | Itabashi | G02B 27/0093 307/9.1 |
| 2008/0024463 | A1 * | 1/2008 | Pryor | B60K 35/00 345/175 |
| 2008/0123322 | A1 * | 5/2008 | Tane | B60K 35/00 362/23.01 |
| 2010/0066645 | A1 * | 3/2010 | Ishii | G02B 27/0101 345/7 |
| 2010/0157430 | A1 * | 6/2010 | Hotta | G02B 27/01 359/630 |
| 2011/0267701 | A1 * | 11/2011 | Moussa | G02B 27/0101 359/630 |
| 2012/0075708 | A1 * | 3/2012 | Hagiwara | B60K 35/00 359/630 |
| 2012/0182242 | A1 * | 7/2012 | Lindahl | B60R 1/12 345/173 |
| 2015/0015457 | A1 * | 1/2015 | Takasu | G02B 27/01 345/7 |
| 2015/0015963 | A1 * | 1/2015 | Takasu | G02B 27/01 359/630 |

FOREIGN PATENT DOCUMENTS

| | | |
|---|---|---|
| JP | 8-91094 A | 4/1996 |
| JP | 8-113059 A | 5/1996 |
| JP | 9-33856 A | 2/1997 |
| JP | 2000-276079 A | 10/2000 |
| JP | 2002-528041 A | 8/2002 |
| WO | 99/23624 A1 | 5/1999 |

* cited by examiner

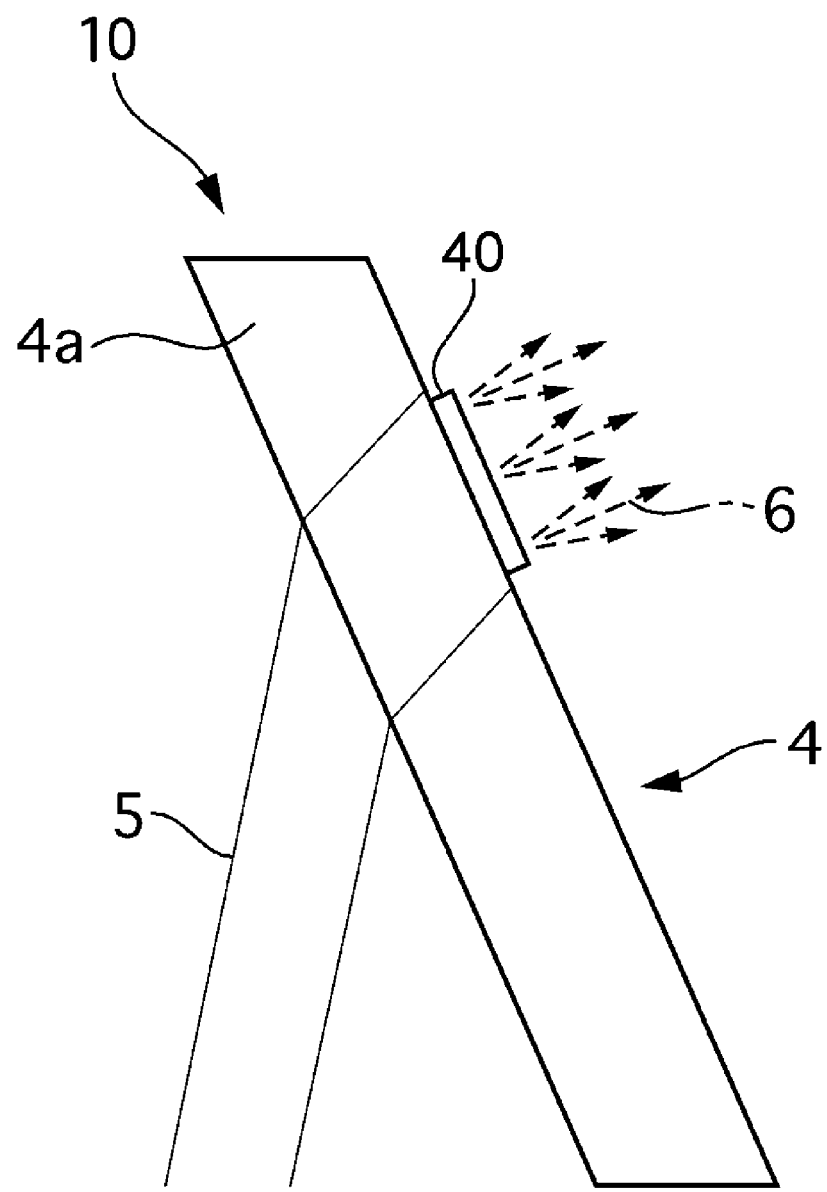

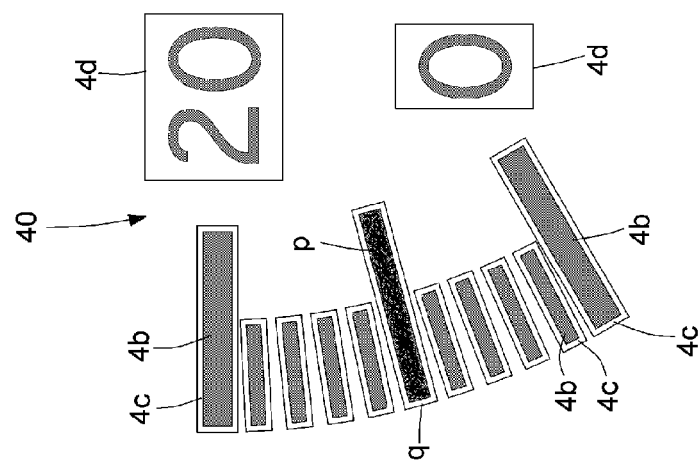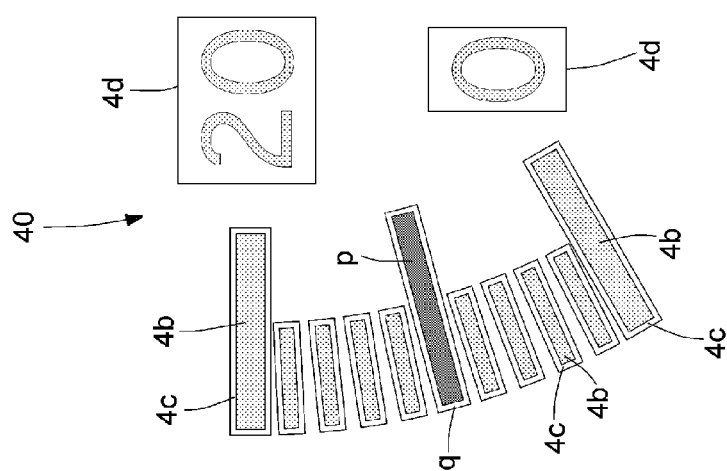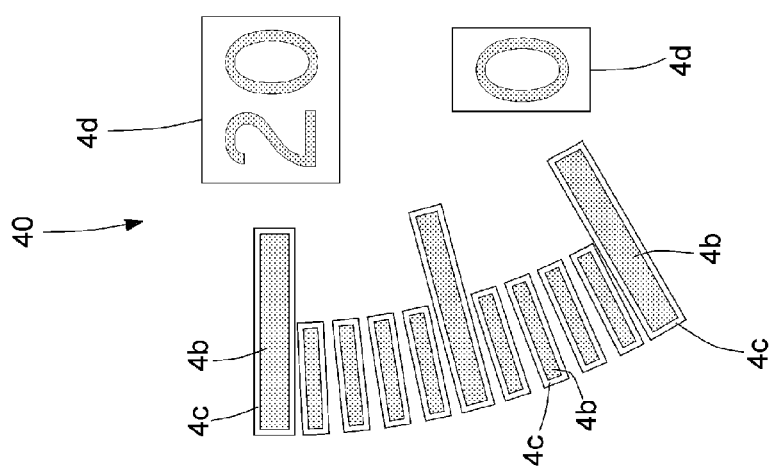

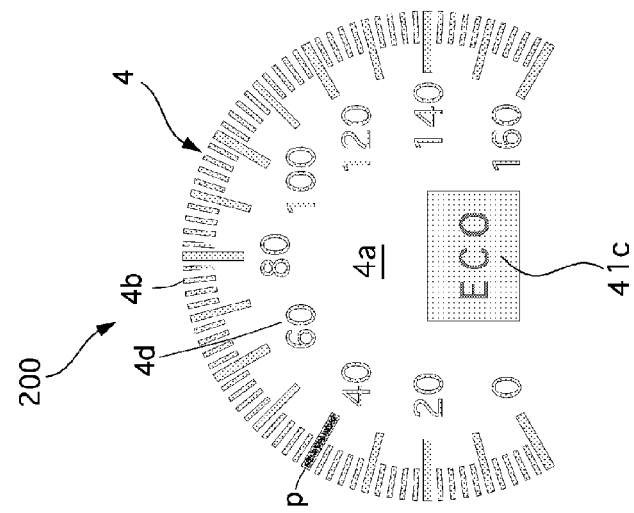
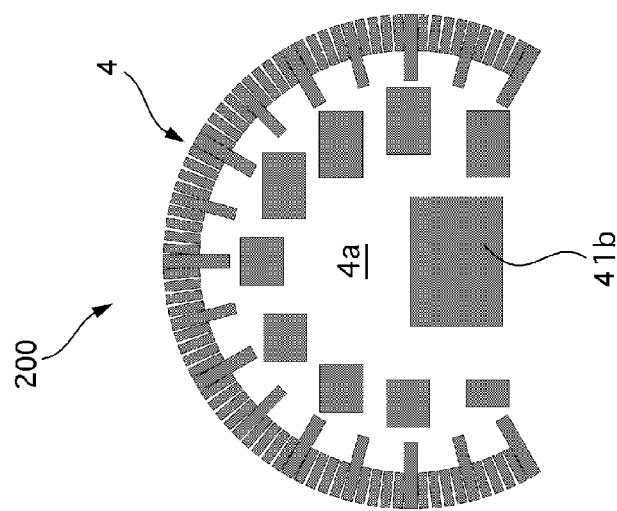
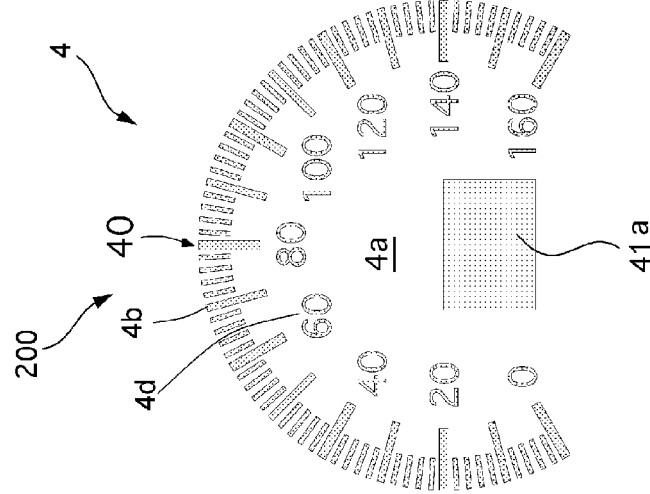

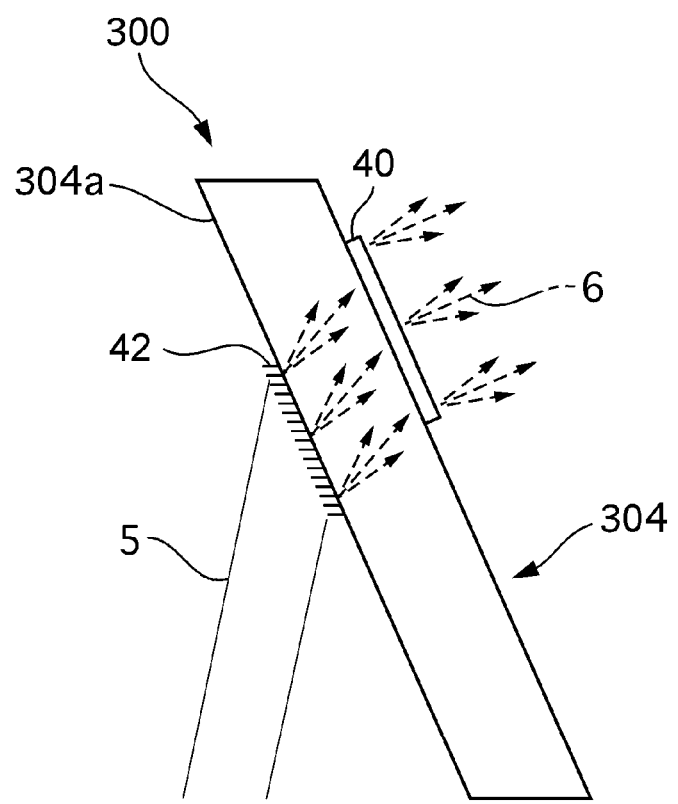

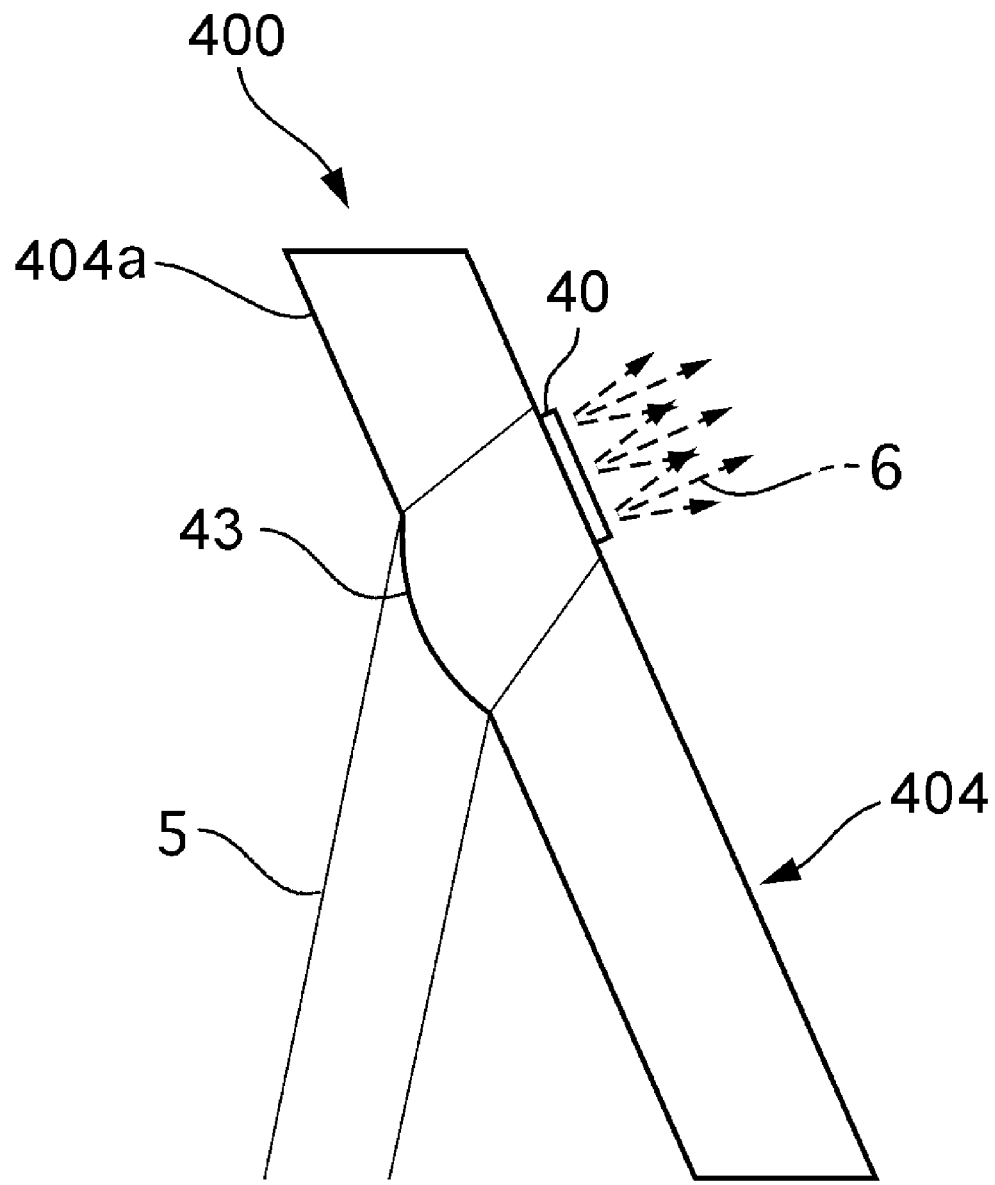

DISPLAY DEVICE FOR VEHICLE

This application is a U.S. national phase filing under 35 U.S.C. §371 of PCT Application No. PCT/JP2013/060686, filed Apr. 9, 2013, and claims priority under 35 U.S.C. §119 to Japanese patent application number JP2012-164354 filed on Jul. 25, 2012, the entireties of which are incorporated herein by reference.

TECHNICAL FIELD

The present invention relates to a vehicle display device that can present data, relating to vehicle data and the like, to a driver while the driver is looking to the front of the vehicle, with the driver's field of view practically unobstructed.

BACKGROUND ART

Patent Document 1 describes such a known display device.

The vehicle display device described in Patent Document 1 employs a hologram, and enables analogue display by two light sources.

Namely, a cylindrical lens is disposed in front of a laser beam source, and a laser beam of a specific width emitted by the laser beam source is concentrated by the lens. By disposing a movably attached mirror at the position of the concentrated beam, and passing the concentrated beam through an opening portion in a dashboard to illuminate the hologram, the concentrated beam is visible to the driver as a pointer behind the windshield and in front of the driver.

Moreover, by disposing a light source closer to the driver than the position of the hologram on the upper face of the dashboard, and illuminating the hologram, a dial behind the windshield and in front of the driver is made visible to the driver.

Patent Document 2 describes another known vehicle display device. The vehicle display device described in Patent Document 2 is a vehicle display system in which light carrying information is emitted from a light emitting display means toward a windshield, such that a display image of the light is made visible to the driver. The display image of the light is formed on the surface of the windshield.

A light emitting lighting means includes an optical member that forms the display image of the light on the windshield surface. A diffusion plate is disposed on at least a portion of the windshield, and the display image is formed on the diffusion face. The diffusion face is a milky-white colored display screen.

RELATED DOCUMENTS

Patent Documents

Patent Document 1: JP-UM-A-5-26590
Patent Document 2: JP-A-8-91094

SUMMARY OF THE INVENTION

Problems that the Invention is to Solve

However, the above-described vehicle display devices each have issues, as described below. Namely, in the vehicle display device described in Patent Document 1, not only is the hologram expensive, but also, since a hologram is employed, external light hitting a vehicle front side face of the hologram is reflected to the vehicle front side, and drivers of oncoming vehicles, pedestrians ahead, and the like are sometimes dazzled by this reflected light.

In the vehicle display device described in Patent Document 2, since the milky-white colored diffusion plate is employed for the whole of the display screen, external light incident from any given direction is reflected or passes through, and is emitted as a diffused light beam in all directions. As a result, diffused light beams are also emitted from portions of the display screen other than the display styling portion, such that the display contrast is reduced, visibility of the display is reduced, and drivers of oncoming vehicles and the like are dazzled by the reflected light.

Since the milky-white diffusion plate is employed as the display screen, various external lights incident to the display screen raise the brightness of the display screen as a whole, and the whole of the display screen shines as a bright milky-white color. As a result, visibility of the scene in front of the vehicle through the display screen is difficult for the driver.

The present invention provides a vehicle display device that suppresses reflection of external light toward the vehicle front, and enables driver visibility of the scene in front of the vehicle through a display screen to be improved insofar as possible.

Means for Solving the Problems

A vehicle display device including:
a combiner, provided between a windshield and a driver's seat, including a transparent region portion and a display styling portion including a light diffusion function; and
an illuminating unit capable of selectively illuminating the display styling portion and a transparent region portion at the periphery of the display styling portion.

Advantage of the Invention

The vehicle display device of the invention is provided with both the transparent region portion and the display styling portion, and the display styling portion and the transparent region portion at the periphery of the display styling portion can be selectively illuminated. Thus reflection of external light toward the vehicle front is suppressed such that oncoming vehicle drivers and the like are not dazzled by the reflected light, and enables driver visibility of the scene in front of the vehicle through the transparent region portion of the display area to be improved insofar as possible.

BRIEF DESCRIPTION OF THE DRAWINGS

FIG. 2 is an enlarged view of a transparent body and a display styling portion provided to a portion thereof, configuring a display screen employed in the vehicle display device of Example 1.

FIGS. 4A to 4C are partial enlarged views illustrating a relationship between a display styling portion and an illumination range thereof on a display screen, in which FIG. 4A illustrates the positional relationship thereof, FIG. 4B illustrates an example of display in bright surroundings, and FIG. 4C illustrates an example of display in dark surroundings.

FIGS. 6A to 6C are face-on views illustrating a display screen employed in a vehicle display device of an Example 3 of the invention, in which FIG. 6A illustrates a display styling portion, FIG. 6B illustrates an illumination range of the display screen by a projector, and FIG. 6C illustrates an example of display thereon.

FIG. 7 is a side view illustrating a transparent body configuring a display screen employed in a vehicle display device of an Example 4 of the invention, and a display styling portion and a light diffusion face provided to a portion of the transparent body.

FIG. 8 is a side view illustrating a transparent body configuring a display screen employed in a vehicle display device of an Example 5 of the invention, and a display styling portion and a lens face provided to a portion of the transparent body.

MODE FOR CARRYING OUT THE INVENTION

Figure 1:
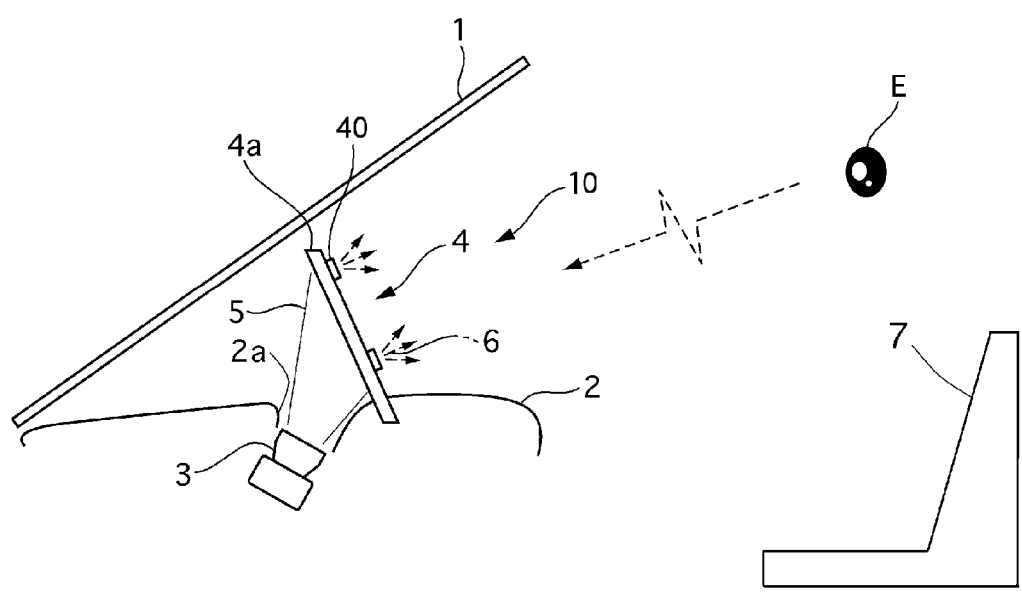
FIG. 1 is a schematic side view illustrating a vehicle display device of an Example 1 of the invention.

Detailed explanation follows regarding an embodiment of the invention, based on Examples illustrated in the drawings.

Note that, in each of the Examples, the same reference numbers are appended to components and sections that are substantially the same, and explanation thereof is omitted.

Example 1

Explanation first follows regarding an overall configuration of a vehicle display device 10 of an Example 1.
As illustrated in FIG. 1, the vehicle display device 10 of Example 1 is provided to a dashboard 2 disposed at a vehicle rear side of a windshield 1 at a front section of a vehicle.
The vehicle display device 10 includes a projector 3, a display screen 4, and a non-illustrated controller.
In the present Example, the vehicle display device 10 is a device that displays the vehicle speed.
The projector 3 includes a Light Emitting Diode (LED), and is a device that is capable of projecting illuminating light 5 and is installed in the dashboard 2. An opening 2a, where a portion of the dashboard 2 is cut away, is formed further to the vehicle front side of the dashboard 2 than the display screen 4.

The projector 3 can illuminate a vehicle front side face of the display screen 4 with the illuminating light 5 through this opening 2a.

As illustrated in FIG. 1 and FIG. 2, the display screen 4 includes a plate shaped transparent body 4a, and a display styling portion 40 provided to a vehicle rear side (a driver's seat 7 side) surface of the transparent body 4a.

A bottom portion of the transparent body 4a is attached further to the vehicle rear side than the opening 2a of the dashboard 2, and a leading end side thereof is inclined toward the vehicle front side. The transparent body 4a is thereby configured such that the display styling portion 40 is easily visible to the eyes E of a driver seated in a driving posture in the driver's seat 7.

Note that the display screen 4 corresponds to a combiner of the invention, and the transparent body 4a corresponds to a transparent region portion of the invention.

The display styling portion 40 has both a light transmission function and a light diffusion function, and is provided to the driver's side surface of the transparent body 4a through white printing, fine dot shaped undulations, nashiji finish, or the like.

Note that during the day, the display styling portion 40 emits display light 6, which is reflected ambient light from the periphery, toward the driver's side, enabling easy visibility for the driver even when there is no illumination from the projector 3.

Figure 3B:
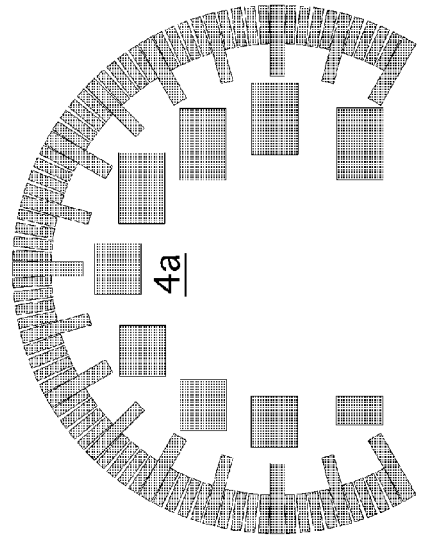
FIG. 3B illustrates an illumination range capable of illumination by a projector on the display screen of the vehicle display device of Example 1.
Figure 3A:
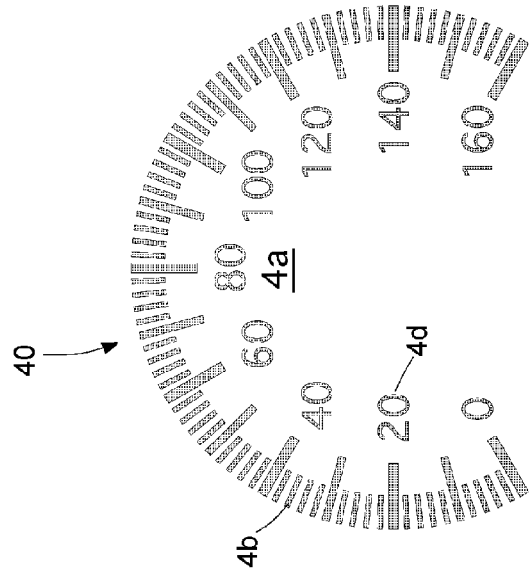
FIG. 3A illustrates the display styling portion provided to the display screen of the vehicle display device of Example 1.

As illustrated in FIG. 3A, the display styling portion 40 includes a circular arc shaped graduation styling portion 4b that is substantially circular in the present Example, and a numerical symbol styling portion 4d that represents the speed level.

Each speed level on the graduation styling portion 4b is represented by a rectangular bar shaped symbol extending in a radial direction, with four short rectangular shaped bar symbols respectively arrayed at equal intervals in a circular arc between long bar symbols, such that each graduation represents 2 km/h.

The numerical symbol styling portions 4d representing the speed level (km/h) depict the numerals 0, 20, 40 and so on at intervals of 20 up to 160, respectively disposed along a circular arc at the inside of the corresponding bar symbols of the graduation styling portion 4b.

Note that the graduation styling portion 4b and the numerical symbol styling portions 4d correspond to a first display styling portion of the invention.

FIG. 3B illustrates an illumination range on the display screen 4 that can be illuminated by the projector 3. The illumination range matches the positions of the graduation styling portion 4b and the numerical symbol styling portions 4d, and is slightly wider than the styling portions 4b, 4d, so as to spread out to the near peripheries thereof.

FIG. 4A is a partial enlarged view of FIG. 3A, illustrating an example of the display styling portion 40 (the portions shaded with dots in FIG. 4A), and illuminated ranges 4c at the near periphery thereof (the white portions surrounded by thin lines in FIG. 4A).

FIGS. 4B and 4C will be explained when explaining operation of the vehicle display device 10.

Explanation follows regarding the operation of the vehicle display device 10 of Example 1.

When a non-illustrated ignition switch is switched ON and the vehicle's power source switches ON, the operation of the vehicle display device 10 during the day, and at night differ, as respectively described below.

During the day, peripheral light enters the whole of display styling portion 40 and is diffused by the display styling portion 40, such that the display styling portion 40 is in a visible state to the driver. At the same time, in cases where the numeral corresponding to the speed of travel is displayed as "10", for example, the controller instructs the projector 3 to illuminate the illuminating light 5 toward a portion p at a graduation indicating "10".

When this is performed, as illustrated in FIG. 4B, the brightness of the portion p at graduation "10" increases due to the light diffusion function. Note that although, for convenience, the increase in brightness is depicted in FIG. 4B by a greater grouping of dots representing the display styling portion 40 and appears darker (blacker) than elsewhere, in reality the appearance is brighter.

In the graduation styling portion 4b of the display styling portion 40, a portion q at a near periphery 4c of the portion p indicating "10" is also selectively hit by the illuminating light 5 from the projector 3. However, since the portion q is configured by the transparent body 4a itself and does not have a light diffusion function, the illuminating light 5 passes straight through the portion q, and is not noticeable to the driver.

Despite the through-passing light reaching the windshield 1, or a non-illustrated vehicle interior roof, the surface area illuminated thereby is suppressed to being an extremely small surface area, such that it does not cause a problem in practice.

As described above, in the graduation styling portion 4b of the display styling portion 40, only the portion p at the graduation corresponding to "10" is displayed with greater brightness than the other portions, such that the driver can easily notice the display, and can ascertain that the speed of travel is 10 km/h.

Note that the brightness of the display styling portion 40 as a whole also varies according to the strength of external light.

Consequently, in order to ensure sufficient brightness difference between the portions of the display styling portion 40 as a whole, and the selectively displayed portion of the display styling portion 40, and to improve the visibility thereof, the intensity of external light is monitored by an illuminance sensor, for example, and, based on external light illumination data, the intensity of the illuminating light 5 of the projector 3, illuminating the selectively indicating portion p, is controlled as appropriate. The necessary brightness difference can therefore be ensured, and visibility of the display styling portion 40 is not reduced.

Note that, in such cases, even when external light of high intensity is incident, or the intensity for selective display by the projector 3 is increased, an increase in power consumption, heat generation, and the like of the vehicle display device 10 as a whole is not a problem since the illumination range is small.

When "10" is displayed at night, the display styling portion 40 as a whole, and the near periphery 4c thereof, are illuminated by the projector 3 at a relatively low intensity. As a result, the display styling portion 40 as a whole is visible to the driver. Moreover, in the graduation styling portion 4b of the display styling portion 40, the projector 3 illuminates the portion p at the graduation corresponding to "10", and the near periphery q at a relatively high intensity.

By doing so, in the display styling portion 40 that is being displayed with a relatively low brightness as a whole, the portion p at the graduation corresponding to "10" is displayed with a relatively high brightness. The difference in brightness enables the portion p at the graduation corresponding to "10" to be made more reliably visible to the driver, while the whole of the display styling portion 40 is visible.

Note that in such cases too, despite the near periphery q of the portion p at the graduation corresponding to "10" also being illuminated with a relatively high brightness, similarly to in the explanation for the case during the day, the near periphery q portion is not noticeable to the driver.

Note that when the indicating portion p is displayed on the graduation styling portion 4b, in addition to the graduation styling portion 4b, the corresponding numerical portion out of the numerical symbol styling portions 4d, 0 km/h, 20 km/h, 40 km/h, and so on, is also illuminated by the projector 3 and displayed, together with the near periphery thereof.

As explained above, in the vehicle display device 10 of Example 1, since portions of the display screen 4 other than the display styling portion 40 are transparent, the vehicle front side is visible in the field of view of the driver through these portions. Namely, the driver can obtain vehicle data (vehicle speed in the present Example) while looking to the front, with practically no obstruction to the field of view.

Moreover, in the vehicle display device 10 of Example 1, even when external light is incident, the brightness of the display styling portion 40 as a whole on the display screen 4 only increases, and portions other than the display styling portion 40 have no light diffusion function and so remain transparent from the perspective of the driver, and the field of view in front can be ensured.

Furthermore, the vehicle display device 10 of Example 1 leads neither to the device becoming expensive, nor to other vehicle drivers and the like being dazzled by unwanted reflection of external light by a hologram, as is the case when a hologram is employed.

Note that in the vehicle display device 10 of the present Example, although the display styling portion 40 having the light diffusion function appears bright due to external light and the selective illumination by the projector 3, and is therefore visible to drivers of other vehicles, the surface area thereof is small, such that there is no concern of dazzling the drivers of other vehicles.

Furthermore, the vehicle display device 10 of Example 1 does not have a moving mechanism, and so any deterioration over time in indication precision, response speed, or the like, is extremely small.

Note that, in the vehicle display device 10 of the above-described Example 1, good visibility is obtained by the projector 3 imparting a difference in brightness between the portion p selectively displayed on the display styling portion 40, and other portions thereof, however an additional difference in display color may also be imparted.

Namely, white printing is, for example, applied to the display styling portion 40 in FIGS. 4A to 4C, and configuration may be made such that the portion p and the near periphery q thereof, illuminated as indication by the projector 3, are selectively illuminated in green when in bright surroundings, such as during the day.

However, when in dark surroundings, such as at night, the display styling portion 40 is illuminated as a whole in a color other than white, and the indicating portion p and the near periphery q thereof are illuminated at a higher intensity in green.

Moreover, the indicating portion p may be varied according to the indicating contents, or the like. For example, by illuminating in green for 100 km/h or less, and by illuminating in red when 100 km/h is exceeded, the driver can be made to notice a warning that speed is high and to drive carefully.

Varying the color of the indicating portion in this way enables a wider scope for the display contents.

In the vehicle display device 10 of Example 1, the projector 3, serving as an illuminating unit, accordingly causes a difference in at least one out of a brightness difference or a display color between the display styling portion 40, and the overall display area of the display screen 4 excluding the display styling portion 40 serving as combiner, and selectively illuminates. This enables visibility of the display styling portion 40 to be further enhanced.

Example 2

Explanation follows regarding a vehicle display device 100 according to an Example 2 of an embodiment.

The vehicle display device 100 of Example 2 employs a similar configuration to Example 1 illustrated in FIG. 1. However, whereas Example 1 employs the transparent body 4a in which all portions have the same plate thickness, a transparent body 104a configuring a display screen 104 in the vehicle display device 100 of Example 2 is formed with an inner circumferential side portion that is thinner than an outer circumferential side portion thereof. A face that forms a graduation styling portion 104b and a numerical symbol styling portion 104d of a display styling portion 140 is also configured differently from Example 1.

Figure 5:
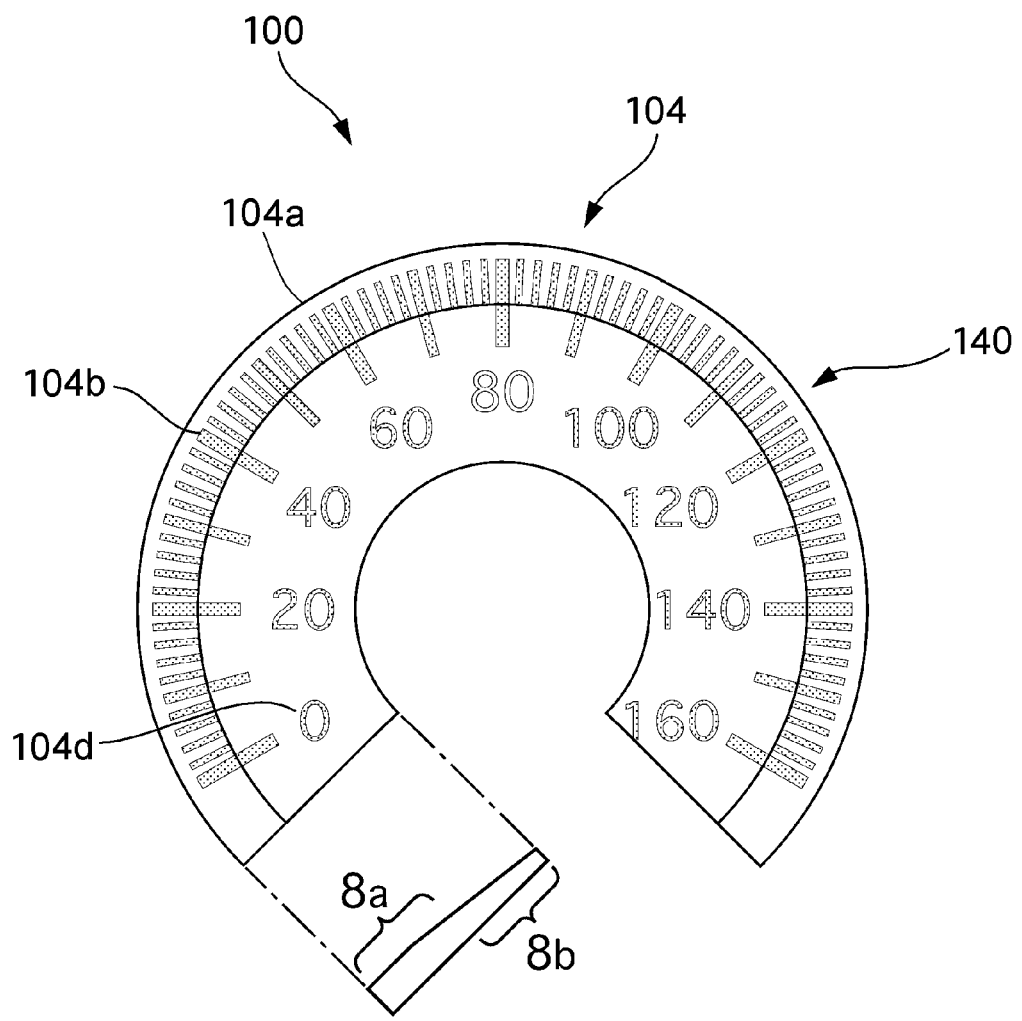
FIG. 5 is a face-on view illustrating a display screen employed in a vehicle display device of an Example 2 of the invention.

Namely, as illustrated in FIG. 5, in the transparent body 104a, an outer circumferential side portion 8a, formed with the graduation styling portion 104b on the driver's side surface, is configured with a uniform thickness, and the outer circumferential side portion 8a is formed thicker than an inner circumferential side portion 8b, formed with the numerical symbol styling portion 104d on the face on the opposite side to the driver's side surface, at the circumferential inside of the outer circumferential side portion 8a.

Moreover, the driver's side surface of the inner circumferential side portion 8b has an inclined shape that becomes thinner on progression toward the inside (the center side).

Radial inside portions of the graduations corresponding to 0 km/h, 20 km/h, and 40 km/h on the graduation styling portion 104b are formed longer than the other graduations, so as to extend onto the inclined face of the inner circumferential side portion 8b.

Note that although FIG. 5 illustrates a face-on view as viewed from the driver's side of the display screen 104, the portion extending downward from the lower left end of the display styling portion 140 of the display screen 104 with single dash intermittent lines illustrates a side face of the display screen 104 for convenience (and is therefore a side face view, the same as a cross-section view), and the cross-section profile thereof forms a trapezoid shape that is long and thin across.

The configuration is otherwise similar to Example 1.

Similarly to Example 1, in the vehicle display device 100 of Example 2, the indicating portion p, and the near periphery q thereof, of the display styling portion 140 are selectively illuminated by the projector 3.

However, in the vehicle display device 100 of Example 2, the positions formed with the graduation styling portion 104b and the numerical symbol styling portion 104d of the display styling portion 140 on the display screen 104 differ in the display screen 104 thickness direction.

There is accordingly a distance difference in the depth direction between the graduations of the graduation styling portion 104b and the numerical symbols of the numerical symbol styling portion 104d. Moreover, portions of the respective long graduations of the graduation styling portion 104b extend as far as the inclined face, with inside end portions thereof appearing to extend toward the back, obtaining a sort of three dimensional (3D) display effect.

This accordingly enables an unexpected and interesting display styling to be exhibited in the vehicle display device 100, thereby enabling the marketability of the display device to be increased.

Example 3

Explanation follows regarding a vehicle display device 200 of an Example 3 of the embodiment.

As illustrated in FIG. 6A, the vehicle display device 200 of Example 3 employs similar portions and configuration to Example 1 or Example 2, with the further addition of an arbitrary display styling portion 41a to the configuration of the display screen 4 (although either of Example 1 or Example 2 may be employed, for convenience, the display screen 4 of Example 1 is illustrated in FIGS. 6A to 6C).

The arbitrary display styling portion 41a is provided slightly to the lower side of a central position inside the display styling portion 40 (the graduation styling portion 4b and the numerical symbol styling portion 4d at the inside thereof) disposed in a circular arc shape. A driver side surface of a portion of the transparent body 4a is imparted with a light diffusion screen function through a fine undulating shape.

Note that the arbitrary display styling portion 41a corresponds to a second display styling portion of the invention.

FIG. 6B illustrates the range that can be illuminated by the projector 3, in which a range corresponding to the arbitrary display styling portion 41a can also be illuminated in addition to the illumination ranges of Example 1 and Example 2 (such as in FIG. 3B).

The vehicle display device 200 of Example 3 accordingly has similar operation to Example 1 and Example 2. As illustrated in FIG. 6C, when travelling at a speed of 40 km/h, for example, the arbitrary display styling portion 41a is also illuminated with illumination light from the projector 3, together with the indicating portion p, and the near periphery q thereof (not illustrated), of the graduation styling portion 4b, and "40" on the numerical symbol styling portion 4d at the inside thereof. The letters "ECO", meaning that the vehicle is being driven economically, are therefore illuminated on the arbitrary display styling portion 41a.

In such cases, in the area where arbitrary display styling portion 41a is provided, the brightness of the light diffusion screen portion increases due to incidence of external light and the driver's forward field of view is consequently narrowed by this amount. However, in practice there are no issues in ensuring the forward field of view as long as the surface area of the arbitrary display styling portion 41a is restricted.

Note that illumination to display the arbitrary display styling portion 41a is stopped when outside of an economical driving range.

In the vehicle display device 200 of Example 3, in addition to the advantageous effects of Example 1 and Example 2, a function to arbitrarily display on the arbitrary display styling portion 41a data different from the graduation styling portion 4b and the numerical symbol styling portion 4d at the inside thereof, can be obtained without adding a separate illumination unit such as a projector or the like, enabling the data amount and quality of the represented contents, the ability to represent display contents, and the like, to be increased.

Example 4

Explanation follows regarding a vehicle display device 300 of an Example 4 of the embodiment.

As illustrated in FIG. 7, in the vehicle display device 300 of Example 4, only a portion of the configuration of a transparent body 304a of a display screen 304 differs, and the remaining configuration is similar to the configuration of each of Examples 1 to 3.

Namely, in the vehicle display device 300 of Example 4, a light diffusion face 42 is provided to a face of the plate shaped transparent body 304a at the opposite side to the side of the driver. The light diffusion face 42 diffuses the illuminating light 5 that enters the light diffusion face 42 from the projector 3, and directs the diffused light toward the display styling portion 40 as the display light 6.

The light diffusion face 42 corresponds to a light guiding unit of the invention.

In addition to the advantageous effects of Examples 1 to 3, the vehicle display device 300 of Example 4 therefore enables illumination of a wider display styling portion 40, even when the illumination range of the projector 3 is the same.

Example 5

Explanation follows regarding a vehicle display device 400 according to an Example 5 of the embodiment.

As illustrated in FIG. 8, in the vehicle display device 400 of Example 5, only a portion of the configuration of a transparent body 404a of a display screen 404 differs, and the remaining configuration is similar to the configuration of each of Examples 1 to 4.

Namely, in the vehicle display device 400 of Example 5, a lens face 43 is provided to a face of the plate shaped transparent body 404a at the opposite side to the side of the driver. The lens face 43 converges the illuminating light 5 that enters the lens face 43 from the projector 3, and directs the light beam toward the display styling portion 40 while narrowing the light beam.

The lens face 43 corresponds to a light guiding unit of the invention.

In addition to the advantageous effects of Examples 1 to 4, the vehicle display device 400 of Example 5 therefore enables the illumination intensity of the display styling portion 40 to be further increased by the lens face 43, such that the display brightness can be increased even when the same projector 3 is employed.

Example 6

Explanation follows regarding a vehicle display device 500 according to an Example 6 of the embodiment.

Figure 9:
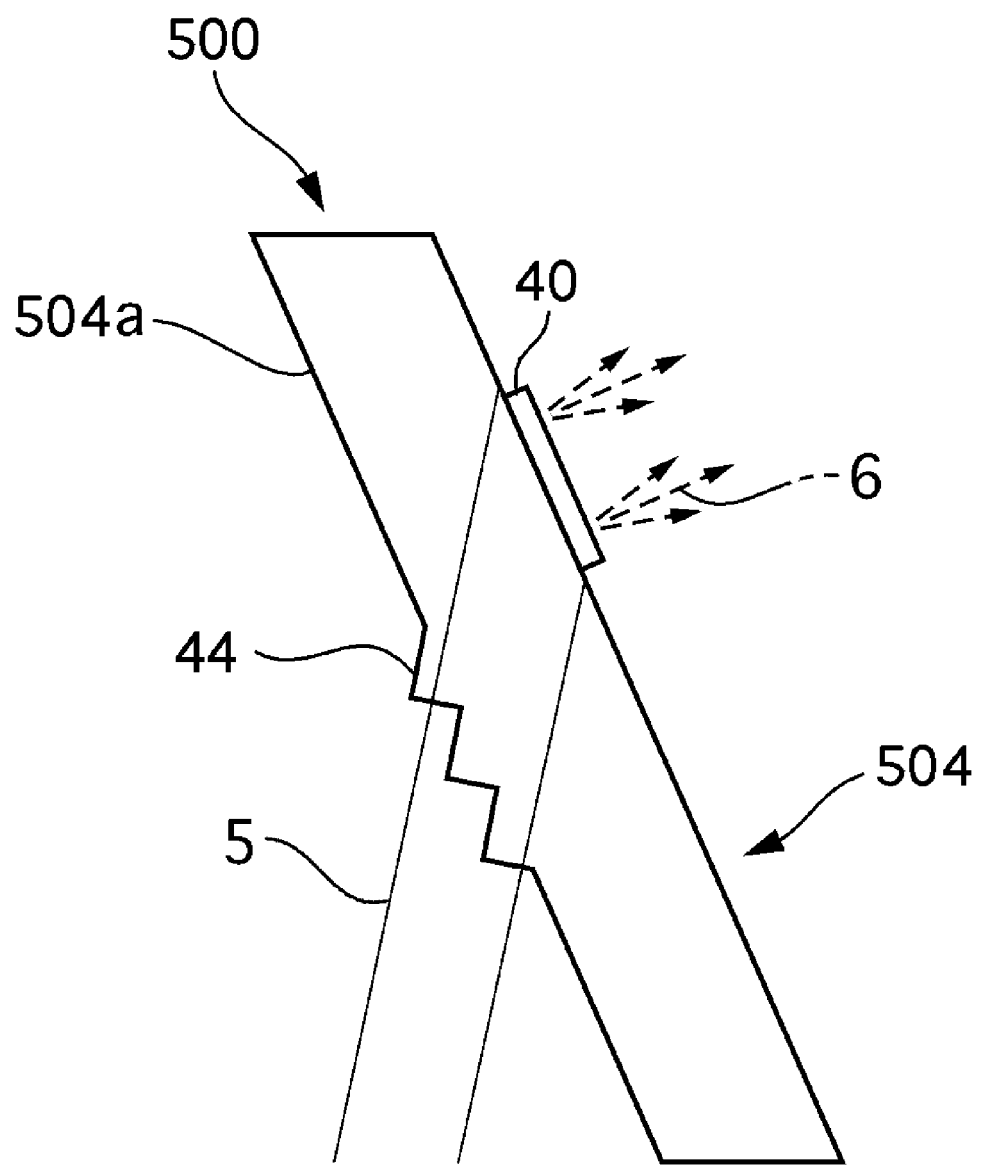
FIG. 9 is a side view illustrating a transparent body configuring a display screen employed in a vehicle display device of an Example 6 of the invention, and a display styling portion and a prism portion provided to a portion of the transparent body.

As illustrated in FIG. 9, in the vehicle display device 500 of Example 6, only a portion of the configuration of a transparent body 504a of a display screen 504 differs, and the remaining configuration is similar to the configuration of each of Examples 1 to 4.

Namely, in the vehicle display device 500 of Example 6, a prism portion 44 formed of plural prisms is provided to a face of the plate shaped transparent body 504a at the opposite side to the side of the driver. The illuminating light 5 entering the prism portion 44 from the projector 3 is made incident to the plate shaped transparent body 504a, and directed toward the display styling portion 40 by the prism portion 44, without the light path thereof being refracted.

The prism portion 44 corresponds to a light guiding unit of the invention.

In addition to the advantageous effects of Examples 1 to 4, in the vehicle display device 500 of Example 6, loss due to surface reflection during incidence to the plate shaped transparent body 504a is therefore reduced, and the illumination intensity of the display styling portion 40 is increased by the same amount, such that the display brightness can be increased.

Example 7

Explanation follows regarding a vehicle display device 600 according to an Example 7 of the embodiment.

Figure 10:
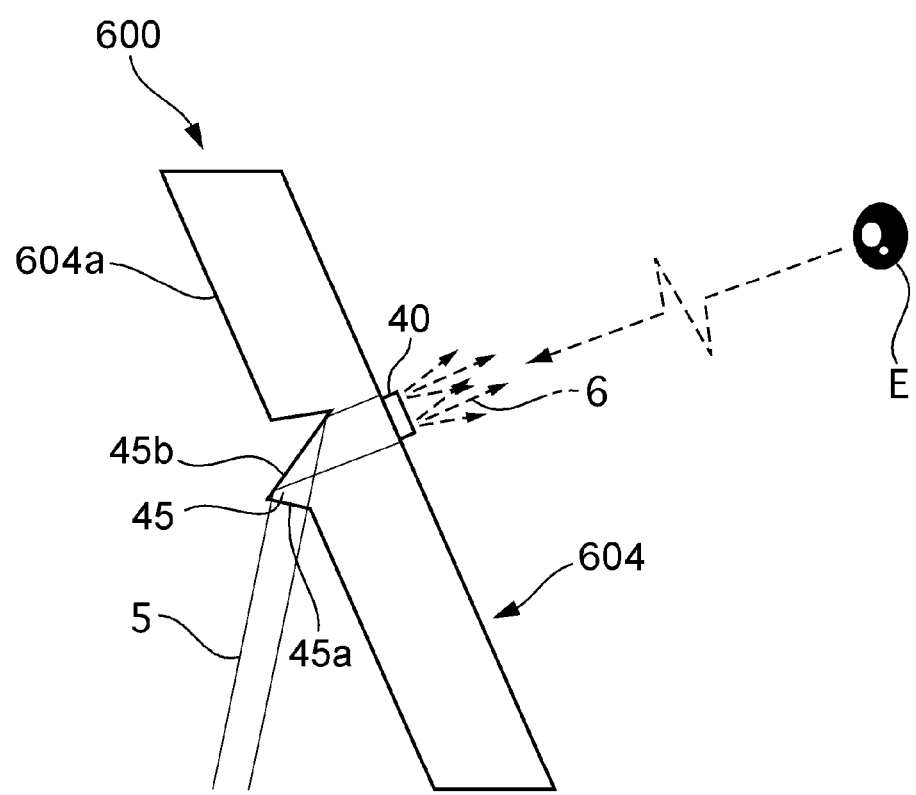
FIG. 10 is a side view illustrating a transparent body configuring a display screen employed in a vehicle display device of an Example 7 of the invention, and a display styling portion and a prism portion with a different shape to the prism portion of Example 6 provided to a portion of the transparent body.

As illustrated in FIG. 10, in the vehicle display device 600 of Example 7, only a portion of the configuration of a transparent body 604a of a display screen 604 differs, and the remaining configuration is similar to the configuration of each of Examples 1 to 4.

Namely, in the vehicle display device 600 of Example 7, a prism portion 45 formed of a triangular cross-section shaped prism with a first face 45a and a second face 45b is provided to a face of the plate shaped transparent body 604a at the opposite side to the side of the driver.

The first face 45a of the prism portion 45 extends in a direction perpendicular to the progression direction of the illuminating light 5 entering the prism portion 45 from the projector 3, and the entering illuminating light 5 is directed toward the second face 45b without being refracted. The entering illuminating light undergoes total reflection at the second face 45b, and is directed toward the display styling portion 40. The prism portion 45 corresponds to a light guiding unit of the invention.

In addition to the advantageous effects of Examples 1 to 4, in the vehicle display device 600 of Example 7, the direction of light beam of the illuminating light reaching the display styling portion 40 can be made to substantially match the observation direction of the driver, such that the display brightness can be increased.

As explained in Example 4 to Example 7, employing any one of the light diffusion face 42, the lens face 43, or the prism portions 44, 45 as a light guiding unit respectively provided to the light-incidence faces of the display screens 304, 404, 504, or 604 enables a light guiding unit to be obtained easily and at low cost.

Example 8

Explanation follows regarding a vehicle display device 700 according to an Example 8 of the embodiment.

Figure 11:
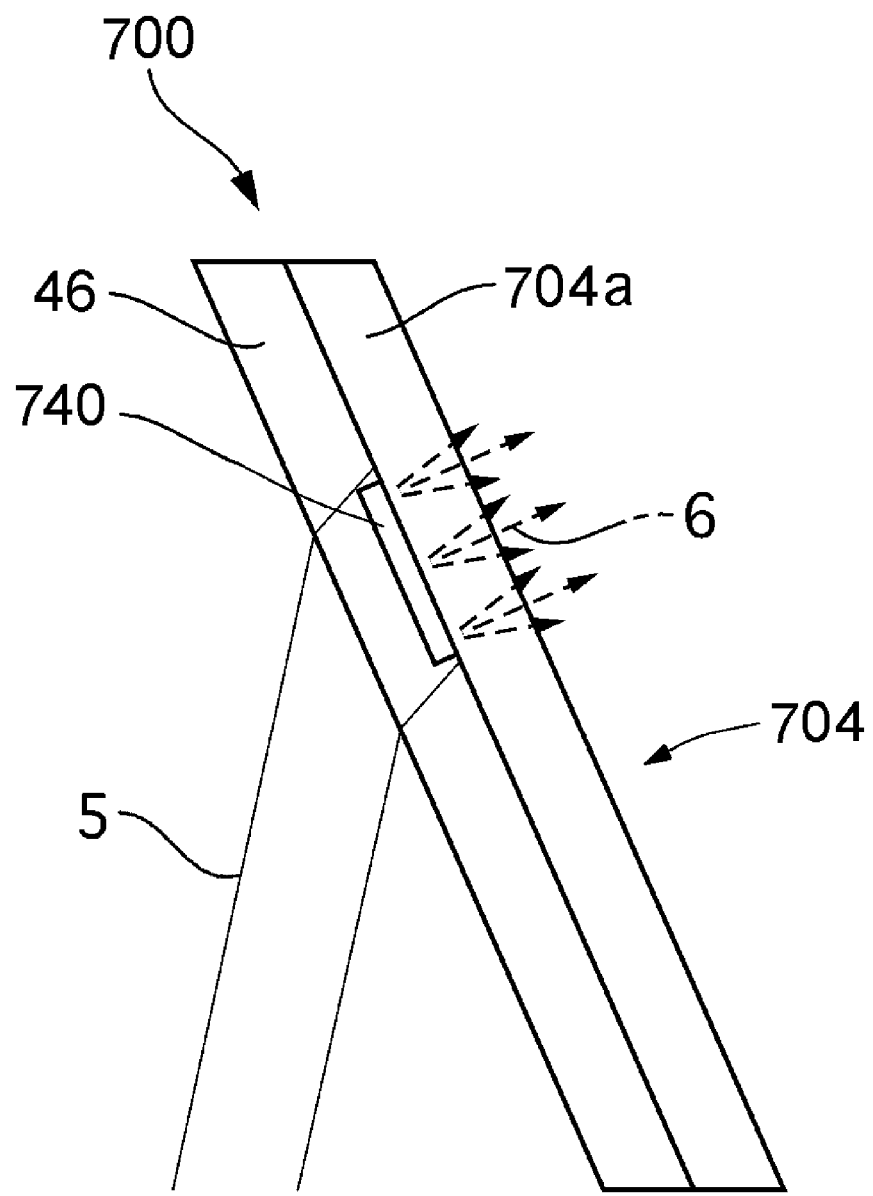
FIG. 11 is a side view illustrating two transparent bodies configuring a display screen employed in a vehicle display device of an Example 8 of the invention, and a display styling portion provided therebetween.

As illustrated in FIG. 11, in the vehicle display device 700 of Example 8, only the configuration of a display screen 704 differs, and the remaining configuration is similar to the configuration of each of Examples 1 to 4.

Namely, in the vehicle display device 700 of Example 8, the display screen 704a is configured by superimposing and adhering a separate plate shaped second transparent body 46 to a face of a plate shaped first transparent body 704a at the opposite side to the side of the driver.

A display styling portion 740 is provided by printing on the illuminating light-incidence face side of the first transparent body 704a, and is disposed between the first transparent body 704a and the second transparent body 46.

In addition to the advantageous effects of Examples 1 to 4, in the vehicle display device 700 of Example 6, the display styling of the display styling portion 740 appears to the driver to be suspended inside the two transparent bodies 704a and 46, enabling an unexpected and interesting display styling, thereby enabling the marketability of the vehicle display device 700 to be increased.

Example 9

Explanation follows regarding a vehicle display device 800 according to an Example 9 of the embodiment.

Figure 12:
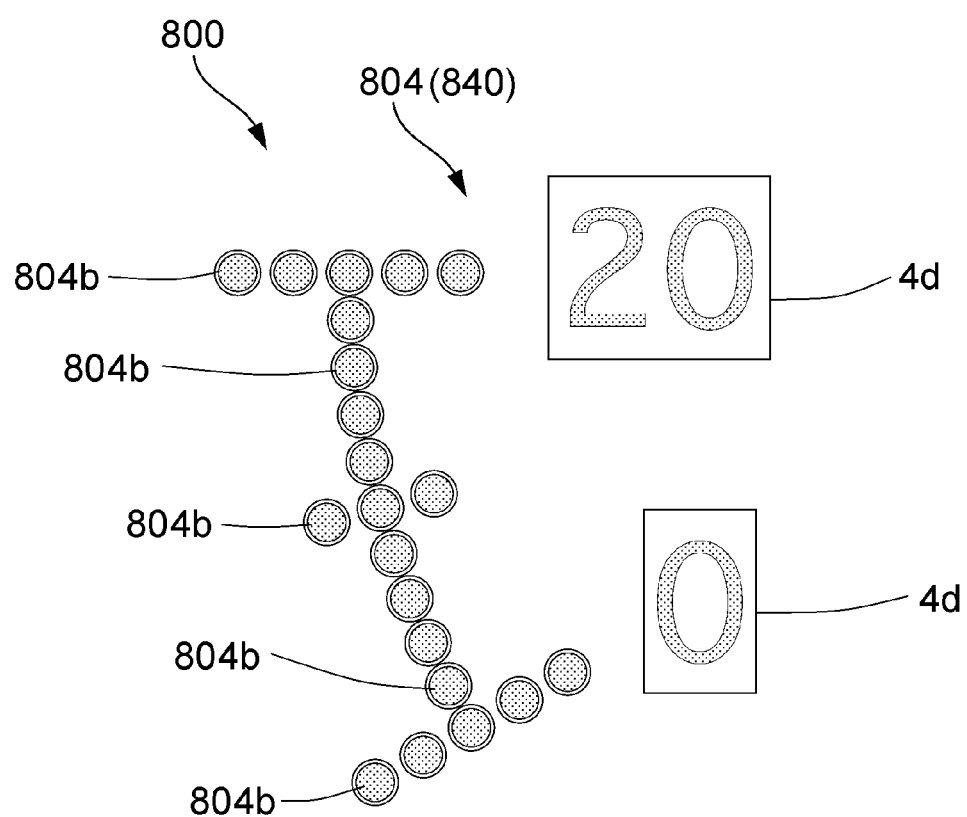
FIG. 12 is a face-on view illustrating an example of a display styling portion configured using circular shapes, provided to a display screen employed in respective vehicle display devices of each of the Examples of the invention.

As illustrated in FIG. 12, in the vehicle display device 800 of Example 9, only the configuration of a display styling portion 840 of a display screen 804 differs, and the remaining configuration is similar to the configuration of each of Examples 1 to 4.

Namely, graduation styling portions 804b of the display styling portion 840 are formed as circular shapes instead of the rectangular bar shapes in the above-described Examples.

Employing various kinds of styling in the display styling portion 40 (140, 740, 840) enables unexpected and interesting display styling, thereby enabling the marketability of the vehicle display device 10 (100 to 800) to be increased.

Note that the display styling portion 40 (140, 740, 840) is not limited to a rectangular bar shape or a circular shape, and other shapes may be employed.

The embodiment has been explained based on each of the above Examples, however the embodiment is not limited to these Examples, and design modifications and the like within a range not departing from the spirit of the embodiment are included in the embodiment.

For example, the vehicle display device 10 (100 to 800) of the embodiment is not limited to a speedometer, and may be applied to display devices displaying other display contents. In such cases, the display styling is obviously configured to match the display contents in each case.

Moreover, illumination by the projector 3 may be configured to repeatedly flash.

The present application is based on Japanese Patent Application (No. 2012-164354), filed on Jul. 25, 2012, the disclosure of which is incorporated in its entirety by reference herein. All references referred to herein are incorporated in their entirety.

DESCRIPTION OF REFERENCE NUMERALS AND SIGNS 1 windshield
2 dashboard
2a opening
3 projector (illumination unit)
4 display screen (combiner)
4a transparent body (transparent region portion)
40 display styling portion
4a transparent body (transparent region portion)
4b graduation styling portion (first display styling portion)
4c near periphery
4d numerical symbol styling portion (first display styling portion)
5 illuminating light
6 display light
7 driver's seat
8a outer circumferential side portion
8b inner circumferential side portion
10 vehicle display device
41a arbitrary display styling portion (second display styling portion)
42 light diffusion face
43 lens face
44, 45 prism portion
45a first face
45b second face
46 second transparent body (transparent region portion)
704a first transparent body

The invention claimed is:

1. A vehicle display device comprising:
a combiner, provided between a windshield and a driver's seat, including a transparent region portion and a plurality of graduation styling portions including a light diffusion function; and
an illuminating unit configured to selectively illuminate and differentiate both (i) one graduation styling portion from among the plurality of graduation styling portions and (ii) a transparent region portion at the periphery of the one graduation styling portion.

2. A vehicle display device comprising:
a combiner, provided between a windshield and a driver's seat, including a transparent region portion and a plurality of graduation styling portions including a light diffusion function; and
an illuminating unit configured to illuminate the plurality of graduation styling portions and a transparent region portion at the periphery of the plurality of graduation styling portions, and configured to selectively illuminate both (i) one graduation styling portion of the plurality of graduation styling portions and (ii) a transparent region portion at the periphery of the one graduation styling portion at a high intensity as compared with other graduation styling portions of the plurality of graduation styling portions.

3. The vehicle display device according to claim 1, wherein:
a forming position of one portion of the display styling portion differs to a forming position of another portion of the display styling portion in a thickness direction of the combiner.

4. The vehicle display device according to claim 1, wherein:
the display styling portion includes a first display styling portion, and a second display styling portion which displays display contents different from display contents displayed by the first display styling portion at a different position to the first display styling portion.

5. The vehicle display device according to claim 1, further comprising:
a light guiding unit which directs light emitted from the illuminating unit toward the display styling portion.

6. The vehicle display device according to claim 5, wherein:
the light guiding unit is provided to a light-incidence face of the combiner, and is a light diffusion face, a lens, or a prism.

\* \* \* \* \*